US007089317B2

(12) United States Patent
Jeyaraman et al.

(10) Patent No.: US 7,089,317 B2
(45) Date of Patent: Aug. 8, 2006

(54) ARCHITECTURE FOR PLUGGING MESSAGING SYSTEMS INTO AN APPLICATION SERVER

(75) Inventors: Thulasiraman Jeyaraman, San Jose, CA (US); Mark William Hapner, San Jose, CA (US); William A. Shannon, Los Altos, CA (US); Kenneth David Saks, Mountain View, CA (US); Kathleen A. Stout, Andover, MA (US); Rahul Sharma, San Jose, CA (US); Qingqing Ouyang, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 728 days.

(21) Appl. No.: 10/106,680

(22) Filed: Mar. 25, 2002

(65) Prior Publication Data
US 2003/0236923 A1   Dec. 25, 2003

Related U.S. Application Data

(60) Provisional application No. 60/367,138, filed on Mar. 21, 2002.

(51) Int. Cl.
*G06F 15/16* (2006.01)
*G06F 3/00* (2006.01)
(52) U.S. Cl. .................. 709/230; 709/203; 719/315
(58) Field of Classification Search ............. 709/206, 709/220, 226, 222, 203, 230; 719/320, 315
See application file for complete search history.

(56) References Cited

U.S. PATENT DOCUMENTS

| | | | | |
|---|---|---|---|---|
| 5,787,245 A | | 7/1998 | You et al. | |
| 5,835,770 A | * | 11/1998 | Shum et al. | 717/127 |
| 6,003,050 A | * | 12/1999 | Silver et al. | 715/536 |
| 6,038,590 A | * | 3/2000 | Gish | 709/203 |
| 6,708,163 B1 | * | 3/2004 | Kargupta et al. | 707/3 |
| 6,721,777 B1 | | 4/2004 | Sharma | |
| 6,757,899 B1 | * | 6/2004 | Zhdankin et al. | 719/315 |
| 6,816,882 B1 | * | 11/2004 | Conner et al. | 709/203 |
| 6,826,716 B1 | * | 11/2004 | Mason | 714/38 |
| 2002/0147961 A1 | | 10/2002 | Charters et al. | |
| 2003/0093402 A1 | | 5/2003 | Upton | |
| 2003/0093470 A1 | | 5/2003 | Upton | |
| 2003/0097574 A1 | | 5/2003 | Upton | |
| 2003/0105884 A1 | | 6/2003 | Upton | |
| 2003/0182452 A1 | | 9/2003 | Upton | |
| 2003/0182459 A1 | | 9/2003 | Jeyaraman | |
| 2004/0015974 A1 | | 1/2004 | Jeyaraman | |

* cited by examiner

*Primary Examiner*—Adrid Etienne
*Assistant Examiner*—El Hadji Sall
(74) *Attorney, Agent, or Firm*—Beyer Weaver & Thomas, LLP

(57) ABSTRACT

A method, apparatus, and system for providing a standard, generic contract between an application server and a message provider which allows the message provider to deliver messages to message endpoints (each of which is associated with a corresponding message application) residing in the application server is disclosed. By generic, it is meant that the contract is independent of the specific messaging style, messaging semantics and messaging infrastructure used to deliver messages. In this way, the contract also serves as the standard message provider pluggability contract that allows any message provider to be plugged into any application server via an associated resource adapter.

15 Claims, 5 Drawing Sheets

ARCHITECTURE FOR PLUGGING MESSAGING SYSTEMS INTO AN APPLICATION SERVER

CROSS REFERENCE TO RELATED APPLICATIONS

This application takes priority under 35 U.S.C. §119(e) of U.S. Provisional Patent Application No. 60/367,138 filed Mar. 21, 2002, entitled "J2EE CONNECTOR ARCHITECTURE" naming Thulasiraman Jeyaraman as inventor, which is also incorporated herein by reference for all purposes. This application is also related to the following co-pending U.S. patent applications, which are filed concurrently with this application and each of which are herein incorporated by reference, (i) U.S. patent application Ser. No. 10/106,293, entitled "CALLBACK EVENT LISTENER MECHANISM FOR RESOURCE ADAPTER WORK EXECUTIONS PERFORMED BY AN APPLICATION SERVER THREAD" naming Jeyaraman as inventor, (ii) U.S. patent application Ser. No. 10/106,671, entitled "MECHANISM TO MANAGE THE LIFECYCLE OF A RESOURCE ADAPTER" naming Jeyaraman as inventor, each of which are incorporated by reference in their entirety.

BACKGROUND OF THE INVENTION

1. Field of Invention

The invention relates generally to computer systems. More particularly, methods and apparatus for providing a generic contract between an application server and a message provider which allows the message provider to deliver messages to message endpoints (MDBs) residing in the application server independent of the specific messaging style, messaging semantics and messaging infrastructure used to deliver messages. Such a contract also serves as the standard message provider pluggability contract that allows any message provider to be plugged into any application server via a resource adapter.

2. Description of Relevant Art

In modern Enterprise Information Systems (EIS) is formed to include a number of EIS resources. An EIS resource provides EIS-specific functionality to its clients examples of which include a record or set of records in a database system, a business object in an ERP system, and a transaction program in a transaction processing system. Generally, an EIS is formed of a number of interconnected personal computers, workstations, mainframes, and the like along with other devices such as large mass storage subsystems, network interfaces, as well as interfaces to the public telephony systems are interconnected providing an integrated environment in which information may be shared among the various users. Typically, users may be performing a variety of operations, including order receipt, manufacturing, shipping, billing, inventory control, and other operations in which sharing of data on a real time basis provides a significant advantage over, for example, maintaining separate records and attempting to reconcile them later.

The Java 2 Platform, Enterprise Edition (J2EE) provides containers for client applications, web components (based on servlets, Java Server Pages) and Enterprise JavaBeans components. These containers provide deployment and runtime support for application components as well as an integrated view of the services provided by underlying application server for the associated application components. Containers can run on existing systems such as, for example, web servers (for the web containers) application servers, TP monitors, and database systems for EJB containers enabling EISs to leverage both the advantages of their existing systems and those of J2EE. For example, EISs can write (or rewrite) new applications using J2EE capabilities and can also encapsulate parts of existing applications in Enterprise Java Beans (EJB), Message Driven Beans (MDB), Java Server Pages (JSP) or Servlets. IN addition, EIS applications access functions and data associated with applications running on Enterprise Information Systems (EIS).

The J2EE Connector architecture defines standard contracts which allows bi-directional connectivity between enterprise applications and EISs. An architecture for integration of J2EE servers with EISs is referred to as a connector architecture. There are two parts to the connector architecture: an EIS vendor-provided resource adapter and an application server that allows this resource adapter to plug in. The contracts support bi-directional communication between the application server and the resource adapter. (It is well to note that a resource adapter is a system-level software driver that is used by a Java application to connect to an EIS. The resource adapter plugs into an application server and provides connectivity between the EIS, the application server, and the enterprise application. The J2EE Connector architecture defines a standard architecture for connecting the Java 2 Platform, Enterprise Edition (J2EE) platform to heterogeneous EISs.)

Accordingly, the connector architecture defines a set of scalable, secure, and transactional mechanisms (i.e., a set of contracts) such as transactions, security, connection management, that a resource adapter has to support to plug in to an application server that enable the integration of EISs with application servers and enterprise applications. The connector architecture also defines a Common Client Interface (CCI) for EIS access. The CCI defines a client API for interacting with heterogeneous EISs. The connector architecture enables an EIS vendor to provide a standard resource adapter for its EIS. In this way, an application server vendor extends its system once to support the connector architecture and is then assured of a seamless connectivity to multiple EISs. Likewise, an EIS vendor provides one standard resource adapter and it has the capability to plug in to any application server that supports the connector architecture.

Asynchronous message delivery or event notification is a widely used application communication paradigm. Some of the characteristics of asynchronous message-based communication paradigm include a message producer is not directly aware of message consumers (there could be one or more consumers interested in the message). Message delivery is solicited, that is, a message consumer has to express interest in receiving messages. Message producer is not directly aware of message consumers and consequently it produces messages of a constant type Messaging infrastructure stores and routes messages reliably (depending on QoS) to interested messsage consumers. Inherently, the interaction is loosely coupled. The message producer and the consumer do not share any execution context. The message producer generally is not interested in the outcome of message processing by consumers. The message delivery always involves a message routing infrastructure, which offers varying QoS for storing (persistence) and routing messages reliably.

J2EE applications could use two different approaches to interact with a message provider. One approach relies upon the direct use specific messaging APIs to send and synchronously receive messages. Alternatively, any message provider could provide a connector resource adapter which supplies connection objects for use by applications to send and synchronously receive messages using the specific messaging API without requiring any additional contracts (it could use MDBs to asynchronously receive messages via a message provider).

While the above approaches allow a J2EE application to send and receive messages, there is no standard system-level contract to plug-in message providers to an application server, and to deliver messages to message endpoints (MDBs) residing in the application server. Without a standard pluggability contract, an application server (of which there may be m) would have to use special contracts to interact with various message providers (of which there may be n), and a message provider has to do the same to interact with different application servers representing an mxn type problem.

Therefore, there is a need for a standard, generic contract between an application server and a message provider which allows the message provider to deliver messages to message endpoints (MDBs) residing in the application server independent of the specific messaging style, messaging semantics and messaging infrastructure used to deliver messages. Such a contract also serves as the standard message provider pluggability contract which allows any message provider to be plugged into any application server via a resource adapter.

SUMMARY OF THE INVENTION

Broadly speaking, the invention relates to an improved method, apparatus and computer system for providing a generic contract between an application server and a message provider which allows the message provider to deliver messages to message endpoints (MDBs) residing in the application server independent of the specific messaging style, messaging semantics and messaging infrastructure used to deliver messages. Such a contract also serves as the standard message provider pluggability contract which allows any message provider to be plugged into any application server via a resource adapter.

In one embodiment a method for providing a generic contract between an application server and a message provider is described. An appropriate resource adapter is selected and activation configuration information from a messaging application is then obtained. Messaging application activation information is then obtained and an activation instance based, in part, upon the selected resource adapter is instantiated. The messaging application in the application server is deployed and a message endpoint factory instance is instantiated in the application server. An messaging endpoint associated with the messaging application is activated thereby allowing the message provider to deliver messages to the message endpoint residing in the application server that is independent of a specific messaging protocol.

In another embodiment of the invention, an apparatus for providing a generic contract between an application server and a message provider is described. The apparatus includes means for selecting an appropriate resource adapter means for obtaining activation configuration information from a messaging application and means for obtaining messaging application activation information, means for instantiating an activation instance based, in part, upon the selected resource adapter, means for deploying the messaging application in the application server, means for instantiating a message endpoint factory instance in the application server ,and means for activating an messaging endpoint associated with the messaging application thereby allowing the message provider to deliver messages to the message endpoint residing in the application server that is independent of a specific messaging protocol.

In yet another embodiment of the invention, a computer program product for providing a generic contract between an application server and a message provider is disclosed. The computer program product includes computer code for selecting an appropriate resource adapter, computer code for obtaining activation configuration information from a messaging application, computer code for obtaining messaging application activation information, computer code for instantiating an activation instance based, in part, upon the selected resource adapter, computer code for deploying the messaging application in the application server, computer code for instantiating a message endpoint factory instance in the application server, and computer code for activating an messaging endpoint associated with the messaging application thereby allowing the message provider to deliver messages to the message endpoint residing in the application server that is independent of a specific messaging protocol.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

Figure 1A:
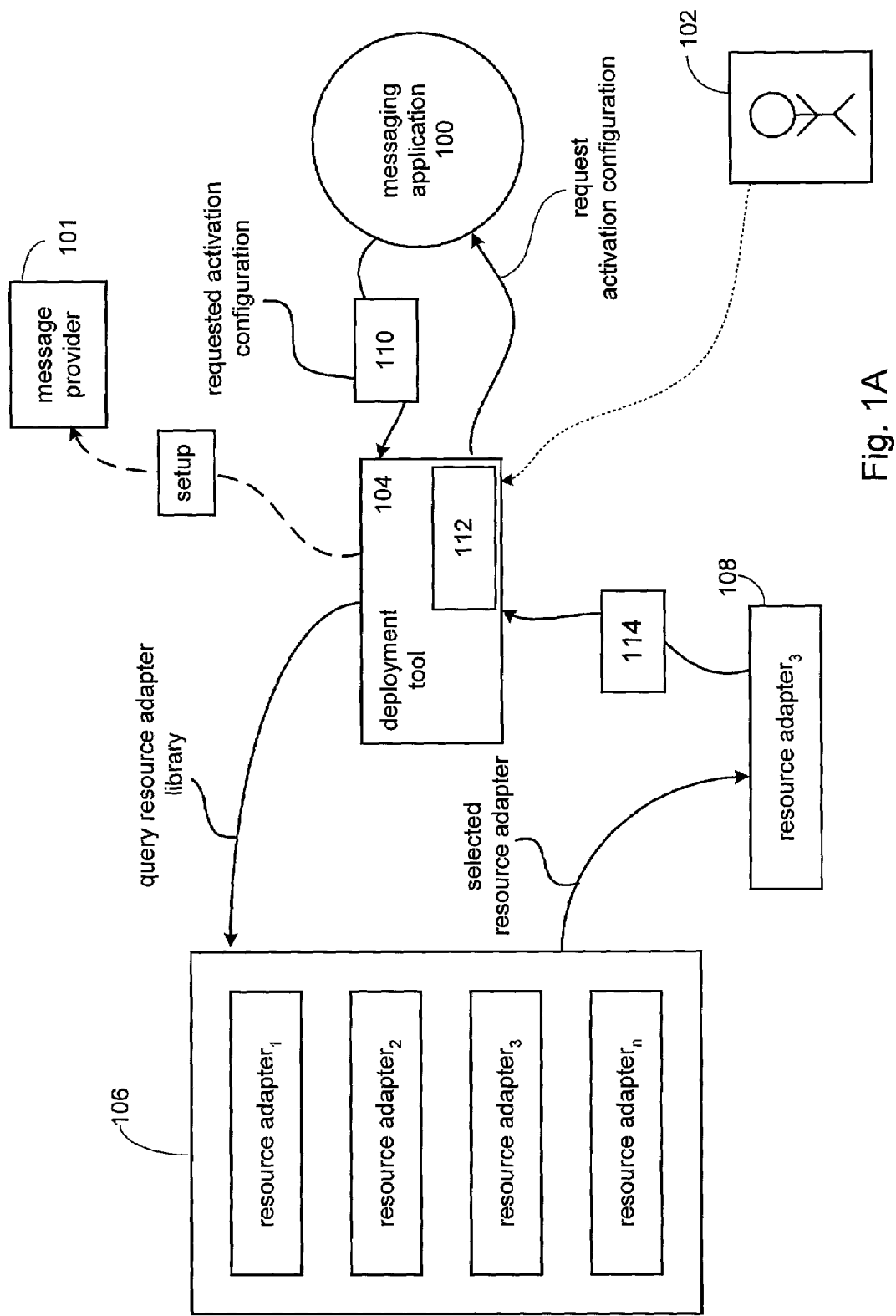
FIGS. 1A–1C illustrates a J2EE based implementation of the messaging system in accordance with an embodiment of the invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, there is provided a method, apparatus, and system for providing a standard, generic contract between an application server and a message provider which allows the message provider to deliver messages to message endpoints (each of which is associated with a corresponding message application) residing in the application server. By generic, it is meant that the contract is independent of the specific messaging style, messaging semantics and messaging infrastructure used to deliver messages. In this way, the contract also serves as the standard message provider pluggability contract that allows any message provider to be plugged into any application server via an associated resource adapter.

Accordingly, a deployer (typically an individual desiring to set up a link between a selected message provider and a particular message application) selects a particular resource adapter from a library of resource adapters (typically provided by the message vendor) based upon particular requirements of the messaging application. Once selected, the deployer, by way of a deployment tool, requests activation information from the messaging application and message specific information (QoS, for example) from the selected resource adapter. The activation information includes a set of configurable properties (specific to the messaging style and the message provider) and is used to instantiate a configuration instance by the deployer for the activation of the messaging application and which is passed on by the resource adapter In this way, the resource adapter is expected to know the endpoint message listener type (using the information from the activation spec) and deliver messages to the endpoint. In some cases, the resource adapter might optionally pass a transactional type instance while creating a message endpoint in order to receive transactional notifications when a message delivery is transacted. The resource adapter supports methods used for application activations and deactivations. The resource adapter supplies a message endpoint factory instance and a configured activation specification instance during endpoint activations and deactivations. In some cases, the resource adapter could reject an activation by throwing an exception, for example, which may be due to any number of reasons, such as incorrect activation information or the application server has not completed endpoint activation, or the application server might decide to limit concurrent message deliveries, or the application server might have encountered an internal error condition. In some cases where the offending condition is temporary, the application server may decide to block the creation of the messaging endpoint instance instead of calling an exception.

In order to receive messages provided (or pushed) by the message provider, the resource adapter instantiates a message endpoint factory, based in part, upon the activation specification. The message endpoint factory provides the link between the message provider and the messaging application. In this way, the message provider is only required to maintain a single contract in order to communicate with any number of application servers thereby reducing the connectivity requirements for the message providers Although, the invention will initially be described in terms of a messaging system as part of a J2EE based enterprise computer system, the present invention can be used in any networked computer system that uses JMS as its messaging infrastructure.

Figure 1B:
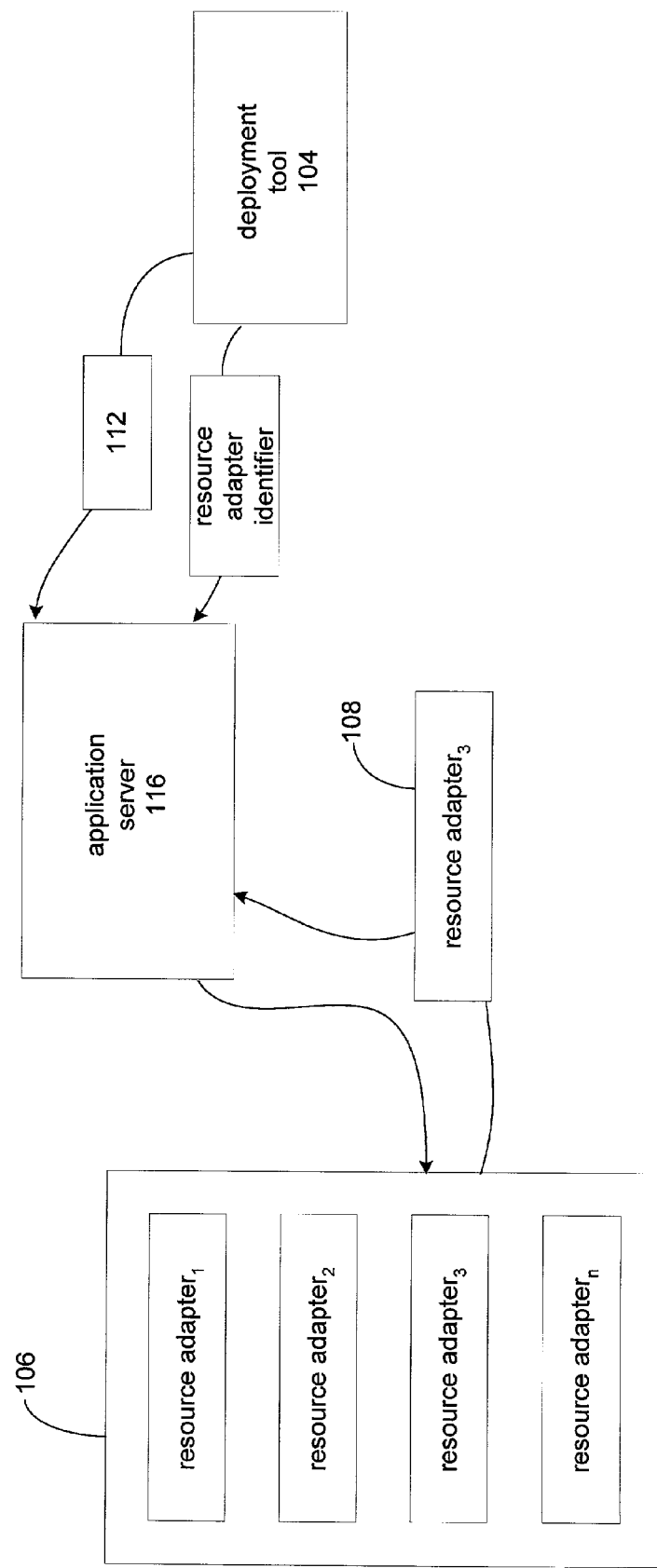
Figure 1C:
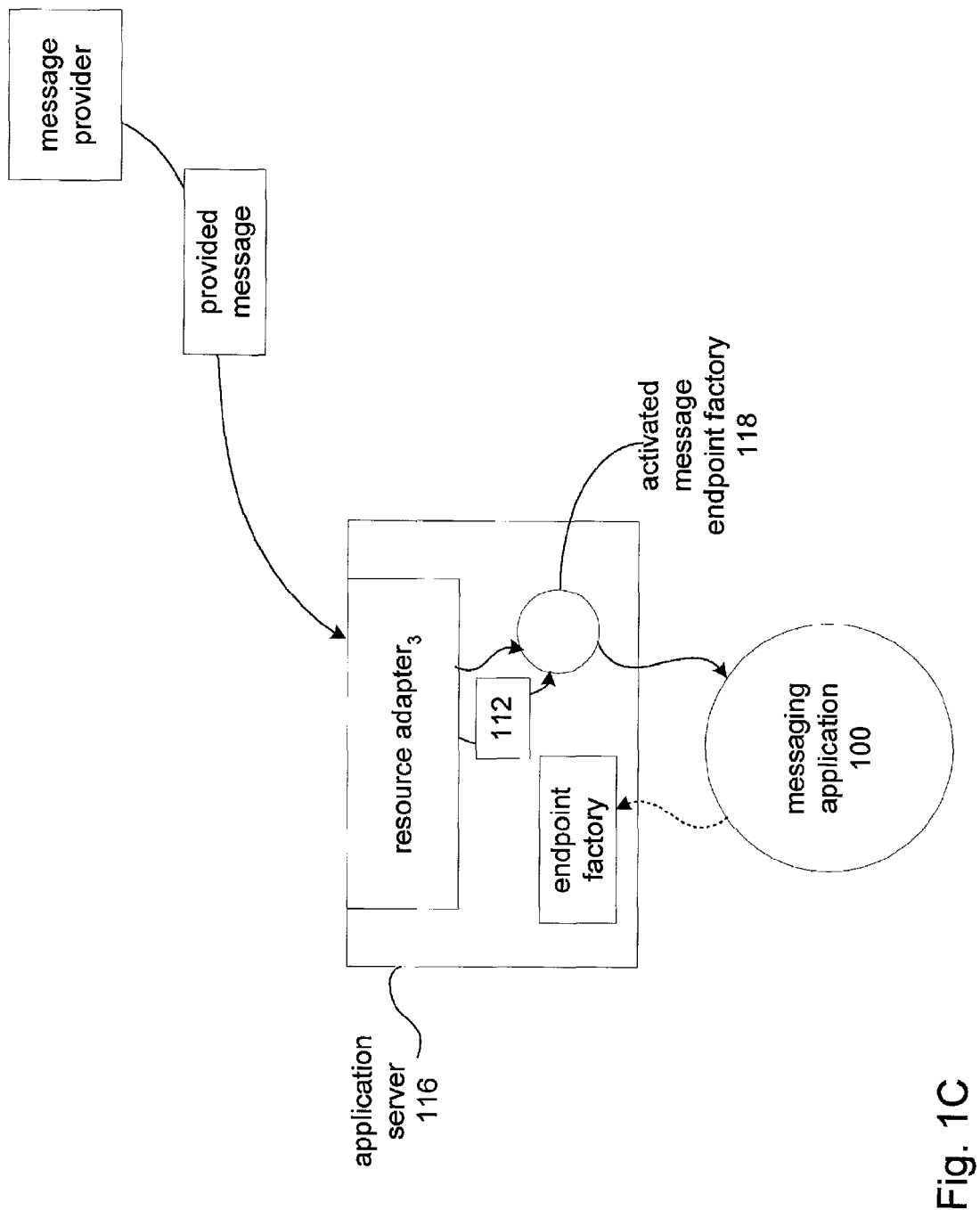

Accordingly, FIGS. 1A–1C illustrates a J2EE based implementation of an exemplary messaging system in accordance with an embodiment of the invention. Referring initially to FIG. 1A, in order to connect a messaging application 100 to a message provider 101, a message endpoint deployer 102 uses a deploy tool 104 to select a suitable resource adapter that matches the needs of the application. In the described embodiment, when deployed on an application server, the messaging application 100 asynchronously consumes messages from the message provider 101 but it is also possible, in some implementations, for the messaging application 100 to send and synchronously receive messages by directly using messaging style specific APIs using a connection object. It should be noted that in the context of this discussion, a message provider (i.e., a messaging infrastructure) is typically an external system that is the source for messages. The message provider provides reliable handling of messages and offers different QoS. A message provider may provide special tools that can be directly used by the application deployer to setup the message provider for message delivery.

In the described embodiment, the messaging application deployer 102, or more simply referred to as the deployer 102 is an intelligent entity (such as, for example a human) that has the responsibility to deploy the message endpoint (application) 100 on an application server. The deployer 102 is expected to know the needs of the messaging application 100 (such as for example, message listener type, Quality of Service (QoS) etc.) and be aware of the details of the runtime environment (i.e., the application server) in which the messaging application 100 would be deployed. In some cases, the deployer 102 may also interact with a message provider to do the necessary setup for message delivery.

Accordingly, the deploy tool 104 is provided either by a message application vendor or a third party since it is the deploy tool 104 that assists the deployer 102 in deploying the messaging application 100 on the application server. In general, the deploy tool provides a list of resource adapters capable of delivering messages to the message messaging application (using, for example, the desired Message Listener type information to identify possible candidates). The deploy tool also provides the activation configuration information provided by the messaging application developer (obtained from the messaging application deployment descriptor) and also provides, in a J2EE environment, an Activation Spec Java Bean instance (obtained from the chosen resource adapter), and helps to configure the JavaBean instance using a property sheet editor, etc. The deploy tool also provides JavaBean instances (obtained from the chosen resource adapter) of administered objects (upon request from messaging application deployer) and helps in configuring them. It passes on the configured JavaBean instances to the application server (it may also serialize the JavaBean instances depending on the address space in which the deploy tool runs). When necessary, the deploy tools also assists in undeploying the message messaging application.

More specifically, referring to FIG. 1A, the deployer 102 uses the deploy tool 104 to query a list of resource adapters 106 capable of delivering messages to the messaging application 100. A resource adapter is a system component located (when deployed) in the address space of the application server. In this way, the resource adapter provides connectivity to various message providers associated therewith. The resource adapter is also capable of delivering messages to messaging applications residing in the application server. The resource adapter is typically provided by a message provider or a third party, and is used to plug-in an external message provider into an application server. In this way, the message provider is only required to support a particular resource adapter to which a subscribing messaging application must conform thereby substantially reducing the connectivity requirements of the various messaging providers over that required for conventional messaging systems.

Once an appropriate resource adapter 108 has been selected by the deployer 102 (by way of the deployment tool 104) the deployer 102 obtains an activation configuration information set 110 that is typically provided by a third party, such as a messaging application developer. It should be noted that the deployer 102 may be required to set up the message provider 101 with information required to receive any incoming messages provided by the messaging application 100 (which may be accomplished by specific tool, or tools, provided by the message provider). In addition to the activation configuration information set 110 from the messaging application 100, the deployer 102 (again using the deployment tool 104) creates an activation spec JavaBean 112 from the selected resource adapter 108 using information in the form of a deployment descriptor 114 based upon, for example, message provider specific details.

Referring to FIG. 1B, once the deployer 102 has configured the Activation Spec JavaBean instance 112 based on the information provided by the application developer or assembler (which is contained in the application deployment descriptor 114 but also may use additional message provider specific information to configure the Activation Spec JavaBean instance 112). In the described embodiment, the Activation Spec JavaBean 112 includes a validation method which may be called by a deploy tool 104 to validate the overall activation configuration information provided by the endpoint deployer 102. This helps to catch activation configuration errors earlier on without having to wait until message application activation time for configuration validation. The deployer 102 also configures a set of administered objects, if necessary (that is, for the case where the endpoint application uses messaging style specific APIs exposed via connection objects to send and synchronously receive messages). As part of the deployment procedure, the deployer 102 provides all the configured JavaBean instances to the application server 116, and also identifies the chosen resource adapter instance (in this case, resource adapter 108) to be used for message delivery.

At this point, as shown in FIG. 1C, the application server 116 activates the messaging application 100 by calling the selected resource adapter 108 which passes a message endpoint factory instance 118 and the Activation Spec JavaBean instance 112 provided by the deployer 102. In order to activate the messaging application 100, the resource adapter 108 provides (via a resource adapter deployment descriptor 120) a list of supported application Message Listener types, and the Java class name of an Activation Spec JavaBean (one for each supported Message Listener type) containing a set of configurable properties which is used to specify message application activation configuration information during message application deployment. Once endpoints are activated, they are ready to receive messages. When messages arrive, the resource adapter uses the message endpoint factory to create an endpoint instance. The resource adapter narrows the endpoint instance to the actual message listener type (it knows the endpoint type from the Activation Spec), and delivers the message to the endpoint instance. The same endpoint instance could be used again to deliver subsequent messages serially; but it must not use the same endpoint instance concurrently. Note that the endpoint instance is a proxy and it is not the actual endpoint. This is necessary because the application server might need to intercept the message delivery in order to inject transactions (depending on the actual endpoint preferences) and to perform other checks. The proxy endpoint instance is implemented by the application server which is used to intercept the message delivery, performs checks, inject transactions, etc and to route the message to the actual message endpoint instance. The resource adapter does not have to make this distinction, and does treat the proxy endpoint instance as the actual endpoint instance.

Once message endpoints are activated, they are ready to receive messages from a message provider. Message delivery setup could either be durable or non-durable. In the case of non-durable message deliveries, messages are lost during application server downtime. When the application server becomes functional again, it automatically reactivates all message endpoints that were previously deployed, and messages delivery starts again. But the messages that were produced during the downtime are lost. This is because messages are not retained by the message provider and redelivered when the message endpoints are reactivated. However, in the case of durable activations, messages are not lost during application server downtime. When the application server becomes functional again, it automatically reactivates all message endpoints that were previously deployed, and messages delivery starts again. The messages that were produced during the downtime are retained by the message provider and redelivered when the message endpoints are reactivated. It is the responsibility of the message provider to persist undelivered messages and redeliver them when the endpoint is available (that is, when the endpoint is reactivated by the app server). Durability of message delivery is an attribute of the activation setup, and thus it must be captured as part of the endpoint activation information. No additional contracts are required to support durable activations. Activation durability can be specified by a endpoint deployer via the Activation Spec JavaBean.

In this way, the message provider is only required to maintain a single contract in order to communicate with any number of application servers thereby reducing the connectivity requirements for the message providers.

In the described embodiment, the message endpoint factory is used to get an endpoint instance via create endpoint call. Each such call results in a new endpoint instance which could be used to deliver messages concurrently; that is, for each active message endpoint, there could be multiple endpoint instances consuming messages concurrently. There is no limit to the number of such endpoint instances that could be created, although the application server may limit the concurrency by either throwing an unavailable exception or by blocking the create endpoint call. Thus, for each message endpoint, depending on traffic, the resource adapter may choose to deliver messages serially using a single endpoint instance or concurrently using multiple endpoint instances. The resource adapter uses the message endpoint factory to create message endpoint instances to deliver messages either serially or concurrently. There is no limit to the number of such endpoints that could be created to deliver messages. It is up to the application server to decide whether to allow message delivery before activation is completed. If the application server chooses to prevent message delivery before an endpoint is activated, it could block the creation of an endpoint until the activation is completed or throw an exception.

If desired, the resource adapter could pass a transactional instance while creating a message endpoint in order to receive transactional notifications when a message delivery is transacted. The application must notify the resource adapter via the transactional instance if a message delivery is transacted.

Figure 2:
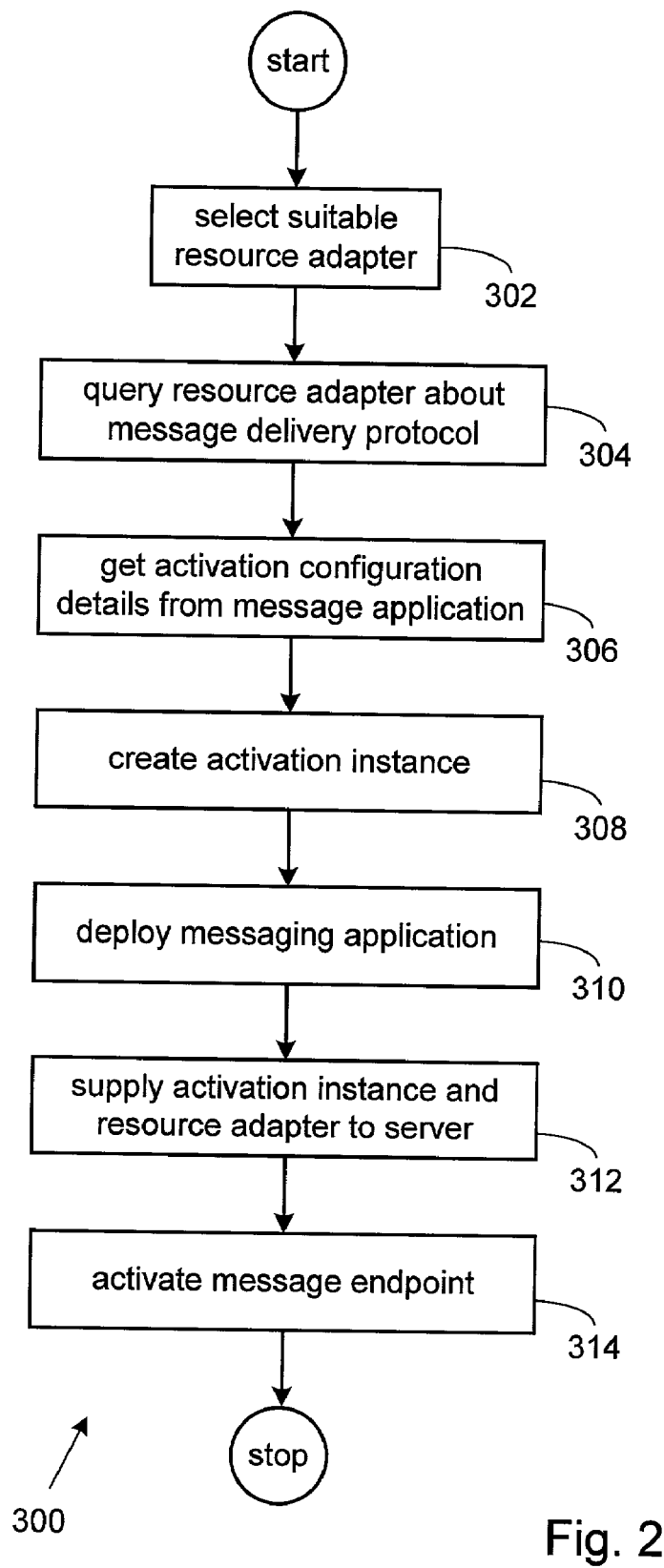
FIG. 2 illustrates a flowchart that details a process connecting a message provider to a messaging application in accordance with an embodiment of the invention.

FIG. 2 shows a flowchart detailing a process 300 for providing a generic contract between an application server and a message provider which allows the message provider to deliver messages to message endpoints (each of which is associated with a corresponding message application) residing in the application server. Accordingly, the process 300 begins at 302 by selecting a resource adapter. At 304, the selected resource adapter is queried about message delivery protocols associated therewith. At 306, activation configuration details are obtained from a messaging application. At 308, an activation specification instance is created based upon the selected resource adapter. At 310, the messaging application is deployed to the application server, while at 312, the activation instance and the selected resource adapter are supplied to the application server. At 314, the message endpoints are activated by passing a handle to an associated message endpoint factory and the activation instance.

Figure 3:
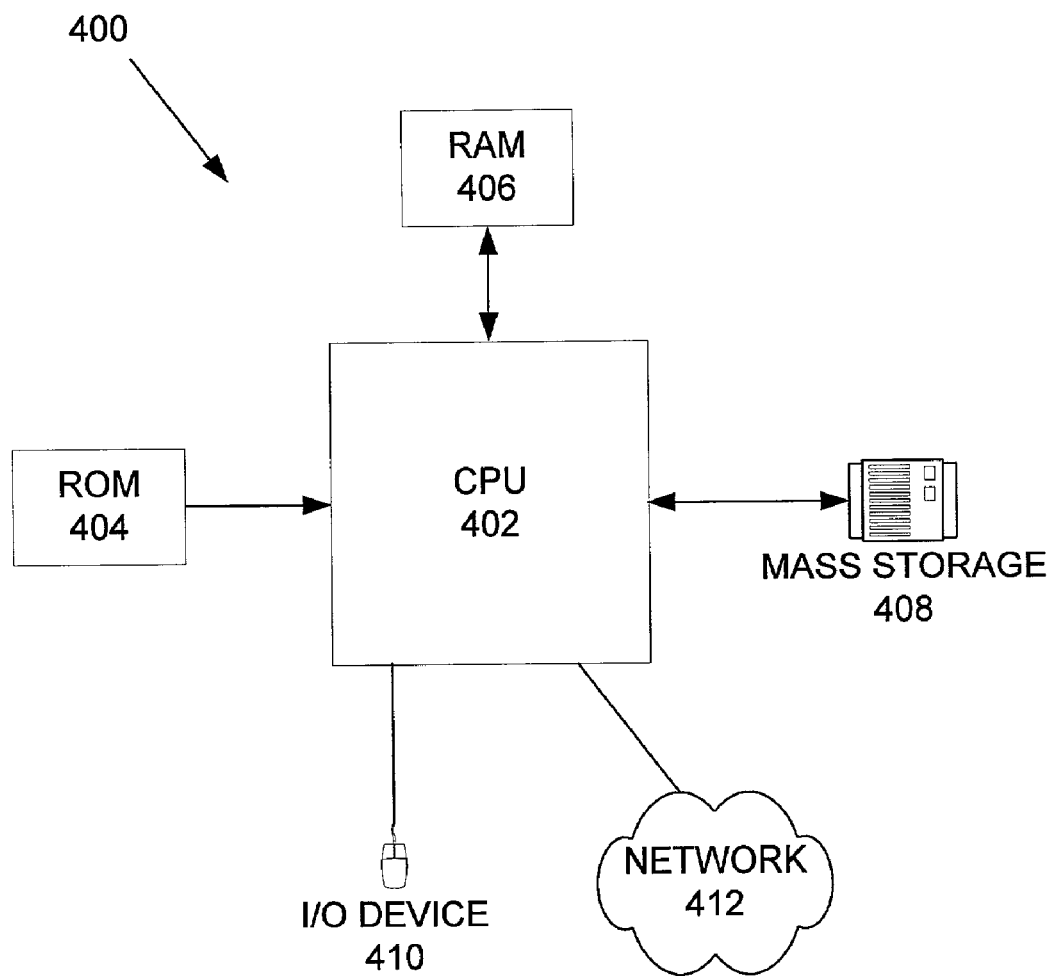
FIG. 3 illustrates a computer system that can be employed to implement the present invention.

FIG. 3 illustrates a computer system 400 that can be employed to implement the present invention. The computer system 400 or, more specifically, CPUs 402, may be arranged to support a virtual machine, as will be appreciated by those skilled in the art. As is well known in the art, ROM acts to transfer data and instructions uni-directionally to the CPUs 402, while RAM is used typically to transfer data and instructions in a bidirectional manner. CPUs 402 may generally include any number of processors. Both primary storage devices 404, 406 may include any suitable computer-readable media. A secondary storage medium 408, which is typically a mass memory device, is also coupled bi-directionally to CPUs 402 and provides additional data storage capacity. The mass memory device 408 is a computer-readable medium that may be used to store programs including computer code, data, and the like. Typically, mass memory device 408 is a storage medium such as a hard disk or a tape which generally slower than primary storage devices 404, 406. Mass memory storage device 408 may take the form of a magnetic or paper tape reader or some other well-known device. It will be appreciated that the information retained within the mass memory device 408, may, in appropriate cases, be incorporated in standard fashion as part of RAM 406 as virtual memory. A specific primary storage device 404 such as a CD-ROM may also pass data uni-directionally to the CPUs 402.

CPUs 402 are also coupled to one or more input/output devices 410 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 402 optionally may be coupled to a computer or telecommunications network, e.g., an Internet network, or an intranet network, using a network connection as shown generally at 412. With such a network connection, it is contemplated that the CPUs 402 might receive information from the network, or might output information to the network in the course of performing the above-described method steps. Such information, which is often represented as a sequence of instructions to be executed using CPUs 402, may be received from and outputted to the network, for example, in the form of a computer data signal embodied in a carrier wave. The above-described devices and materials will be familiar to those of skill in the computer hardware and software arts.

It should be noted that the present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

Although only a few embodiments of the present invention have been described, it should be understood that the present invention may be embodied in many other specific forms without departing from the spirit or the scope of the present invention.

Although the methods of providing reliable B1B communications in accordance with the present invention are particularly suitable for implementation with respect to a Java™ based environment; the methods may generally be applied in any suitable object-based environment. In particular, the methods are suitable for use in platform-independent object-based environments. It should be appreciated that the methods may also be implemented in some distributed object-oriented systems.

It should also be appreciated that the present invention may generally be implemented on any suitable object-oriented computer system. Therefore, the present examples are to be considered as illustrative and not restrictive, and the invention is not to be limited to the details given herein, but may be modified within the scope of the appended claims along with their full scope of equivalents.

What is claimed is:

1. A method for providing a generic contract between an application server and a message provider, the generic contract specifying mechanisms that allow the message provider to deliver messages to message endpoints residing in the application server independently of specific messaging protocols, the method comprising:
   selecting an appropriate resource adapter from a library of resource adapters;
   obtaining activation configuration information from a messaging application;
   obtaining messaging application activation information;
   instantiating an activation instance based, in part, upon the selected resource adapter;
   deploying the messaging application in the application server;
   instantiating a message endpoint factory instance in the application server; and
   activating a messaging endpoint associated with the messaging application thereby allowing the message provider to deliver messages to the message endpoint in accordance with the generic contract.

2. The method of claim 1, wherein the messaging protocol includes: a messaging style, a messaging semantic and a messaging infrastructure used to deliver the messages.

3. The method of claim 1, wherein the activating the messaging endpoint factory comprises:
   calling the selected resource adapter byte application server.

4. The method of claim 3, further comprising:
   passing a message endpoint factory instance and the activation instance.

5. The method of claim 4, wherein when a message arrives,
   using the message endpoint factory to create an endpoint instance by the resource adapter;

narrowing the endpoint instance to the actual message listener type based upon the activation instance; and delivering the message to the endpoint instance.

6. An apparatus for providing a generic contract between an application server and a message provider, the generic contract specifying mechanisms that allow the message provider to deliver messages to message endpoints residing in the application server independently of specific messaging protocols, the apparatus comprising:

means for selecting an appropriate resource adapter from a library of resource adapters;

means for obtaining activation configuration information from a messaging application;

means for obtaining messaging application activation information;

means for instantiating an activation instance based, in part, upon the selected resource adapter;

means for deploying the messaging application in the application server;

means for instantiating a message endpoint factory instance in the application server; and means for activating a messaging endpoint associated with the messaging application thereby allowing the message provider to deliver messages to the message endpoint in accordance with the generic contract.

7. The apparatus of claim 6, wherein the messaging protocol includes: a messaging style, a messaging semantic and a messaging infrastructure used to deliver the messages.

8. The apparatus of claim 6, wherein the activating the messaging endpoint factory comprises:

means for calling the resource adapter by the application server.

9. The apparatus of claim 8, further comprising:

means for passing a message endpoint factory instance and the activation instance.

10. The apparatus of claim 9, wherein when a message arrives, means for using the message endpoint factory to create an endpoint instance by the resource adapter;

means for narrowing the endpoint instance to the actual message listener type based upon the activation instance; and means for delivering the message to the endpoint instance.

11. A computer program product for providing a generic contract between an application server and a message provider, the generic contract specifying mechanisms that allow the message provider to deliver messages to message endpoints residing in the application server independently of specffic messaging protocols, the computer program product being stored on a machine-readable medium, comprising instructions operable to cause a computer to:

select an appropriate resource adapter from a library of resource adapters;

obtain activation configuration information from a messaging application;

obtain messaging application activation information;

instantiate an activation instance based, in part, upon the selected resource adapter;

deploy the messaging application in the application server;

instantiate a message endpoint factory instance in the application server; and activating a messaging endpoint associated with the messaging application thereby allowing the message provider to deliver messages to the message endpoint in accordance with the generic contract.

12. The computer program product of claim 11, wherein the messaging protocol includes: a messaging style, a messaging semantic and a messaging infrastructure used to deliver the messages.

13. The computer program product of claim 11, wherein the instructions to activate the messaging endpoint factory comprises instructions to:

call the selected resource adapter by the application server.

14. The computer program product of claim 13, further comprising instructions to:

pass a message endpoint factory instance and the activation instance.

15. The computer program product of claim 4, further comprising instructions to when a message airives, use the message endpoint factory to create an endpoint instance by the resource adapter;

narrow the endpoint instance to the actual message listener type based upon the activation instance; and deliver the message to the endpoint instance.

* * * * *

UNITED STATES PATENT AND TRADEMARK OFFICE
CERTIFICATE OF CORRECTION

| | |
|---|---|
| PATENT NO. | : 7,089,317 B2 |
| APPLICATION NO. | : 10/106680 |
| DATED | : August 8, 2006 |
| INVENTOR(S) | : Jeyaraman et al. |

Page 1 of 1

It is certified that error appears in the above-identified patent and that said Letters Patent is hereby corrected as shown below:

In the Claims:

In line 3 of claim 3 (column 10, line 59) change "byte" to --by the--.

In line 3 of claim 8 (column 11, line 31) add --selected-- after the first instance of "the".

In line 2 of claim 15 (column 12, line 38) change "airives" to --arrives--.

Signed and Sealed this

Twentieth Day of February, 2007

JON W. DUDAS
*Director of the United States Patent and Trademark Office*